United States Patent
Eryazici et al.

(10) Patent No.: US 12,454,628 B2
(45) Date of Patent: Oct. 28, 2025

(54) AQUEOUS DISPERSION OF SINGLE PHASE CROSSLINKED MICROSPHERES AND FILM-FORMING POLYURETHANE PARTICLES

(71) Applicant: Rohm and Haas Company, Collegeville, PA (US)

(72) Inventors: Ibrahim Eryazici, Phoenixville, PA (US); Joseph Hoefler, Perkiomenville, PA (US); Nick Nicholas, Newark, DE (US); Edwin A. Nungesser, Horsham, PA (US)

(73) Assignee: Rohm and Haas Company, Collegeville, PA (US)

(*) Notice: Subject to any disclaimer, the term of this patent is extended or adjusted under 35 U.S.C. 154(b) by 385 days.

(21) Appl. No.: 17/922,808

(22) PCT Filed: May 27, 2021

(86) PCT No.: PCT/US2021/034386
§ 371 (c)(1),
(2) Date: Nov. 2, 2022

(87) PCT Pub. No.: WO2021/247341
PCT Pub. Date: Dec. 9, 2021

(65) Prior Publication Data
US 2023/0174817 A1    Jun. 8, 2023

Related U.S. Application Data

(60) Provisional application No. 63/034,654, filed on Jun. 4, 2020.

(51) Int. Cl.
*C09D 175/04* (2006.01)
*C08L 75/04* (2006.01)
*C09D 7/40* (2018.01)

(52) U.S. Cl.
CPC .......... *C09D 175/04* (2013.01); *C08L 75/04* (2013.01); *C09D 7/69* (2018.01); *C09D 7/70* (2018.01)

(58) Field of Classification Search
CPC .......... C09D 175/04; C09D 7/69; C09D 7/70; C09D 7/42; C09D 5/00; C08F 265/06; C08F 285/00; C08F 220/1804; C08L 75/04
See application file for complete search history.

(56) References Cited

U.S. PATENT DOCUMENTS

| | | | |
|---|---|---|---|
| 5,569,707 A | 10/1996 | Blum et al. | |
| 5,959,027 A | 9/1999 | Jakubowski et al. | |
| 7,829,626 B2 | 11/2010 | Chiou et al. | |
| 8,686,096 B2 | 4/2014 | Deetz et al. | |
| 2004/0242765 A1 | 12/2004 | Munzmay et al. | |
| 2005/0222368 A1 | 10/2005 | Reiners et al. | |
| 2008/0305342 A1* | 12/2008 | Reiners | C08G 18/12 524/588 |
| 2019/0177554 A1* | 6/2019 | Bohling | C09D 7/62 |
| 2020/0385825 A1 | 12/2020 | Nungesser et al. | |

FOREIGN PATENT DOCUMENTS

| | | |
|---|---|---|
| EP | 2727949 A1 | 5/2014 |
| EP | 2845870 A1 | 3/2015 |
| EP | 3106526 A1 | 12/2016 |
| EP | 3502196 A1 | 6/2019 |
| WO | 2020086545 A1 | 4/2020 |

OTHER PUBLICATIONS

Chen et al. (NPL titled: Trends of spray drying: A critical review on drying of fruit and vegetable juices. M.R.I. Shishir, W. 50 Chen / Trends in Food Science & Technology 65 (2017) 49-67. (Year: 2017).*

Leather, "Ecological leather finishes formulated with polyurethane binders" 2001, retrieved from https://www.leathermag.com/features/featureecological-leather-finishes-formulated-with-polyurethane-binders/.

* cited by examiner

*Primary Examiner* — Hai Y Zhang
(74) *Attorney, Agent, or Firm* — Reid Willis

(57) ABSTRACT

The present invention relates to composition comprising an aqueous dispersion of single phase crosslinked low $T_g$ microspheres and film-forming polyurethane particles. The composition of the present invention is useful as a basecoat layer for a multilayered leather article.

11 Claims, No Drawings

AQUEOUS DISPERSION OF SINGLE PHASE CROSSLINKED MICROSPHERES AND FILM-FORMING POLYURETHANE PARTICLES

BACKGROUND OF THE INVENTION

The present invention relates to a composition comprising an aqueous dispersion of single phase crosslinked low $T_g$ microspheres and film-forming polyurethane particles. The composition of the present invention is useful as a basecoat layer for a leather substrate.

Leather is routinely finished by a multistep process that includes applying a basecoat to the leather surface followed by applying a topcoat. The basecoat is routinely applied in the first step of treating leather to provide color, softening, and embossing, as well as protection from damage over years of extended use. Under normal conditions of use, leather is subject to flexing, stretching, and contorting, any of which may lead to cracking and further deterioration from added stresses over time. The topcoat gives feel and ease of cleaning without damaging the leather.

Basecoat compositions contain matting agents to provide a dull finish. Inorganic matting agents such as silica based materials and calcium carbonate are disfavored because they are known to disrupt film integrity by inducing cracking and causing losses in water and abrasion resistance as well as flexibility. Advances in matting agents that overcome some of the problems associated with inorganic matting agents include multistaged polymeric microspheres, as described by Chiou et al. in U.S. Pat. No. 7,829,626. Nevertheless, these microspheres, while more robust than their inorganic counterparts, do not provide the desired flexibility in the leather substrate.

Accordingly, it would be an advance in the art of treated flexible substrates such as matte finished leather to provide a robust coating that retains film integrity and protection of the substrate under stress.

SUMMARY OF THE INVENTION

The present invention addresses a need in the art by providing, in one aspect, a composition comprising an aqueous dispersion of a) film-forming polymer particles comprising polyurethane polymer particles having a z-average particle size in the range of from 50 nm to 500 nm, as determined by dynamic light scattering, and a $T_g$ of less than 10° C.; and b) non-film-forming single phase crosslinked polymeric microspheres having a median weight average particle size in the range of from 2 µm to 30 µm and a $T_g$ of not greater than 10° C.

In another aspect, the present invention is a multilayered article comprising a) a leather; b) a basecoat layer superposing the substrate and having a dry film thickness in the range of from 10 µm to 100 µm; and c) a topcoat layer superposing the basecoat layer and having a dry film thickness in the range of from 2 µm to 30 µm; wherein the basecoat layer comprises non-film-forming single phase crosslinked polymeric microspheres embedded in a first polymeric film, wherein the polymeric microspheres have a median weight average particle size in the range of from 2 µm to 30 µm and $T_g$ of not greater than 10° C., and the first polymeric film has a $T_g$ of less than 10° C.; and wherein the topcoat layer comprises a second polymeric film.

The composition of the present invention addresses a need in the art by providing a flexible matte finish to a flexible substrate such as leather to retain flexibility without significant cracking under accelerating stress testing conditions.

DETAILED DESCRIPTION OF THE INVENTION

In one aspect, the present invention is a composition comprising an aqueous dispersion of a) film-forming polymer particles comprising polyurethane polymer particles having a z-average particle size in the range of from 50 nm to 500 nm, as determined by dynamic light scattering, and a $T_g$ of less than 10° C.; and b) non-film-forming single phase crosslinked polymeric microspheres having a median weight average particle size in the range of from 2 µm to 30 µm and a $T_g$ of not greater than 10° C. The weight-to-weight ratio of low $T_g$ crosslinked single phase microspheres to the film-forming polymer particles having a $T_g$ of less than 10° C. is preferably in the range of 1:1, more preferably from 1:2 to 1:10, more preferably to 1:8.

The aqueous composition comprises film-forming polyurethane particles having a $T_g$ of less than 10° C., preferably less than 0° C., and preferably greater than −60° C. As used herein, "particles" or "polymer particles" are synonymous with binder or latex particles. Aqueous dispersions of polyurethane particles suitable for use in the composition are well known in the art—see, for example, U.S. Pat. Nos. 5,569,707, 5,959,027, and US 2004/0242765 A1—and are commercially available, for example as Bayderm Polyurethane Binders and PRIMAL™ Polyurethane Binders (a Trademark of The Dow Chemical Company or its Affiliates).

The aqueous composition further comprises non-film-forming single phase crosslinked polymeric microspheres having a particle size in the range of from 2 µm, preferably from 4 µm, to 30 µm, preferably to 20 µm, more preferably to 15 µm, and most preferably to 10 µm. The polymeric microspheres have a $T_g$ of not greater than 10° C., preferably less than 0° C., and preferably greater than −60° C. as calculated by the Fox equation. As used herein, "single phase" refers to microspheres that are neither covered by a shell nor occluded with domains having a $T_g$ of greater than 25° C. as calculated by the Fox equation. Preferably, the composition comprises a substantial absence of multiphase microspheres, that is, a substantial absence of low $T_g$ microspheres clad with a high $T_g$ shell or occluded with high $T_g$ domains. As used herein "substantial absence" refers to less than 10, preferably less than 5, and most preferably 0 weight percent, based on the weight of the single phase microspheres in the composition, of multiphase microspheres. The single phase crosslinked microspheres comprise structural units of one or more monoethylenically unsaturated monomers whose homopolymers have a $T_g$ of not greater than 10° C. (low $T_g$ monomers) such as methyl acrylate, ethyl acrylate, n-butyl acrylate, and 2-ethylhexyl acrylate. Preferably, the single phase crosslinked microspheres comprise from 50, more preferably from 70, more preferably from 80 weight percent, and most preferably from 90, to preferably 99, and more preferably to 97.5 weight percent structural units of a low $T_g$ monomer.

As used herein, the term "structural unit" of a named monomer refers to the remnant of the monomer after polymerization. For example, a structural unit of n-butyl acrylate is as illustrated:

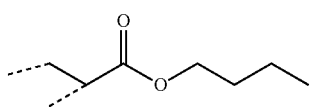

structural unit of n-butyl acrylate where the dotted lines represent the points of attachment of the structural unit to the polymer backbone.

The crosslinked single phase microspheres also comprise structural units of a multiethylenically unsaturated monomer, examples of which include allyl methacrylate, allyl acrylate, divinyl benzene, trimethylolpropane trimethacrylate, trimethylolpropane triacrylate, butylene glycol (1,3) dimethacrylate, butylene glycol (1,3) diacrylate, ethylene glycol dimethacrylate, and ethylene glycol diacrylate. The concentration of structural units of the multiethylenically unsaturated monomer in the crosslinked microspheres is preferably in the range of from 1, more preferably from 2 weight percent, to 10, more preferably to 8, and most preferably to 6 weight percent, based on the weight of the polymeric microspheres.

The polymeric microspheres may further comprise, based on the weight of the microspheres, from 0.05 to 5 percent structural units of a polymerizable organic phosphate represented by the structure of Formula I:

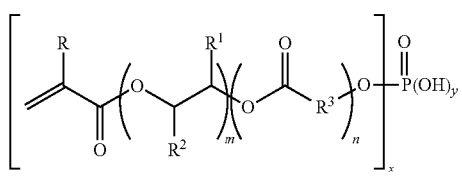

or a salt thereof; wherein R is H or $CH_3$, wherein $R^1$ and $R^2$ are each independently H or $CH_3$, with the proviso that $CR^2CR^1$ is not $C(CH_3)C(CH_3)$; each $R^3$ is independently linear or branched $C_2$-$C_6$ alkylene; m is from 1 to 10; n is from 0 to 5; with the proviso that when m is 1, then n is from 1 to 5; x is 1 or 2; and y is 1 or 2; and x+y=3 when m is 1 then n is from 1 to 5; x is 1 or 2; and y is 1 or 2; and x+y=3.

When n is 0, x is 1, and y is 2, the polymerizable organic phosphate or salt thereof is represented by the structure of Formula II:

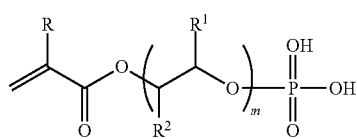

Preferably, each $R^1$ is H, and each $R^2$ is H or $CH_3$; m is preferably from 3, and more preferably from 4; to preferably to 8, and more preferably to 7. Sipomer PAM-100, Sipomer PAM-200 and Sipomer PAM-600 phosphate esters are examples of commercially available compounds within the scope of the compound of Formula II.

Where n is 1; m is 1; R is $CH_3$; $R^1$ and $R^2$ are each H; $R^3$ is —$(CH_2)_5$—; x is 1 or 2; y is 1 or 2; and x+y=3, the polymerizable organic phosphate or salt thereof is represented by the structure of Formula III:

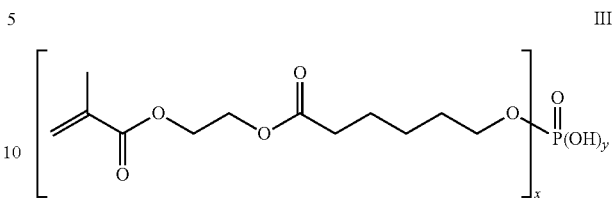

A commercially available compound within the scope of Formula III is Kayamer PM-21 phosphate ester.

The polymeric microspheres may also comprise 0.05 to 5 weight percent, based on the weight of the microspheres, of an ethylene oxide salt of a distyryl or a tristyryl phenol represented by the structure of Formula IV:

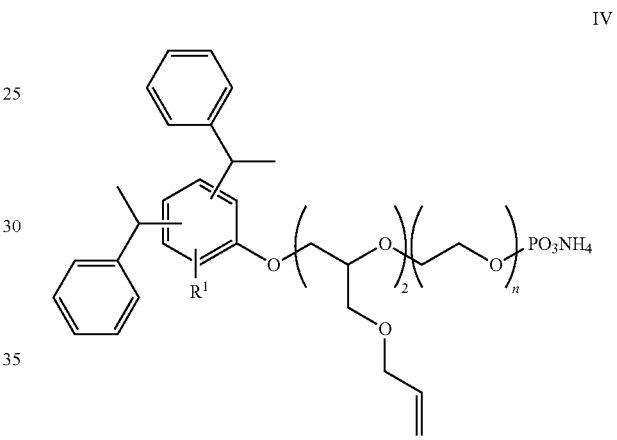

where $R^1$ is H, $CH_2CR=CH_2$, $CH=CHCH_3$, or 1-phenethyl; R is $C_1$-$C_4$-alkyl; and n is 12 to 18. A commercial example of the structure of Formula IV is E-Sperse RS-1684 reactive surfactant.

The single phase crosslinked microspheres may also comprise structural units of monomers whose homopolymers have a $T_g$ greater than 25° C. (high $T_g$ monomers), such as methyl methacrylate, styrene, or t-butyl methacrylate, provided the concentration of structural units of these high $T_g$ monomers is sufficiently low to ensure that the $T_g$ of the microspheres is not greater than 10° C.

The single phase crosslinked microspheres can be prepared as described by suspension polymerization methods known in the art, such as EP 3 502 196 A1, para [0059] to para [0061]. The method may also include growing out microspheres in the presence of a nonionic polyalkylene oxide of a distyryl or tristyryl phenol or an anionic polyalkylene oxide salt of a distyryl or tristyryl phenol, as described in US 2019/0177554, para [0054] to para [0060].

The film-forming polymer particles may also comprise non-polyurethane particles having a z-average particle size, as determined by dynamic light scattering, in the range of 50 nm and 500 nm and having a $T_g$ of less than 10° C. Examples of other polymer particles include acrylic, styrene-acrylic, and vinyl acetate polymer particles. The acrylic polymer particles preferably comprise at least 30, more preferably at least 50, and most preferably at least 80 percent structural units of acrylate or methacrylate monomers, such as methyl methacrylate, methyl acrylate, ethyl acrylate, n-butyl acrylate, and 2-ethylhexyl acrylate, and combinations thereof. The acrylic polymer particles may also include structural units of acid monomers such as carboxylic acid, sulfur acid, and phosphorus acid monomers. Preferably, the polyurethane particles comprise at least 30 weight percent of the film-forming polymer particles, more preferably at least 50 weight percent of the film-forming polymer particles in the composition.

The composition advantageously includes a number of other components including rheology modifiers, pigments, surfactants, softening agents, and waxes.

The composition is useful as a basecoat for a leather substrate, which may be natural or synthetic. Accordingly, in a second aspect, the present invention is a multilayered article comprising a) a leather substrate; b) a basecoat layer superposing the leather substrate and having a thickness in the range of from 10 µm to 100 µm; and c) a topcoat layer superposing the basecoat layer and having a thickness in the range of from 2 µm to 30 µm; wherein the basecoat layer comprises non-film-forming single phase crosslinked polymeric microspheres embedded in a first polymeric film, wherein the polymeric microspheres have a median weight average particle size in the range of from 2 µm to 30 µm and a $T_g$ of not greater than 10° C., and the first polymeric film has a $T_g$ of less than 10° C.; and wherein the topcoat layer comprises a second polymeric film.

The basecoat layer preferably has a dry film thickness in the range of from 20 µm to 60 µm and comprises the non-film-forming single phase crosslinked polymeric microspheres embedded in a polymeric film. Both the film and the microspheres have a $T_g$ of less than 10° C., and preferably less than 0° C. The polymeric film is preferably an acrylic, styrene-acrylic, poly(vinyl acrylate), or polyurethane film or a combination thereof. A more preferred polymeric film comprises a combination of acrylic and polyurethane polymers. The polymeric microspheres are preferably acrylic, styrene-acrylic, vinyl acrylate, silicone, or urethane polymers, preferably acrylic or styrene-acrylic polymers, and have a median weight average particle size ($D_{50}$) in the range of from 2 µm, more preferably from 4 µm, to 30 µm, preferably to 20 µm, more preferably 15 µm, more preferably to 13 µm, and most preferably to 10 µm, as measured using Disc Centrifuge Photosedimentometer, as described herein. The basecoat preferably further comprises less than 10, more preferably less than 5, and most preferably 0 weight percent microspheres clad with a high $T_g$ shell or occluded with high $T_g$ domains, based on the weight of single phase microspheres in the basecoat layer. The weight-to-weight ratio of crosslinked polymeric microspheres to the first polymeric film is in the range of from 1:1, more preferably from 1:2, to 1:10, more preferably to 1:8. The basecoat layer advantageously further comprises additional components including rheology modifiers, pigments, surfactants, softening agents, matting agents, and waxes.

The topcoat preferably has a dry film thickness in the range of 5 µm to 25 µm and comprises a second polymeric film having a $T_g$ of less than 10° C., preferably less than 0° C., as calculated by the Fox equation.

The second polymeric film is preferably an acrylic, styrene-acrylic, vinyl acetate, or polyurethane based polymeric film. The topcoat advantageously further comprises additional components including dullers, pigments, feel modifiers, wetting agents, rheology modifiers, and crosslinking agents. Preferably, the thickness of the basecoat is greater than the thickness of the topcoat.

The multilayered article is advantageously prepared as follows: A basecoat comprising the composition of the present invention along with a rheology modifier, a pigment, a surfactant, a softening agent, and a matting agent is sprayed or roll coated onto the leather substrate, and dried at high temperature (generally ~90° C.). After being allowed to cure, the basecoated substrate is embossed with a patterned embossing plate or smooth rolled, then either milled or mechanically staked. A second basecoat, which is a color coat, is preferentially spray or roll coated to the coated substrate and dried as described above. A topcoat is then spray or roll coated to the base/color coated leather and cured, generally for 3 days.

The article of the present invention provides robust protection for a variety of embossed coatings under accelerated flex testing.

EXAMPLES

DCP Particle Sizing Methods for Acrylic Oligomer Seed and Microspheres

Median weight average particle sizes ($D_{50}$) were measured using Disc Centrifuge Photosedimentometer (DCP, CPS Instruments, Inc., Prairieville, LA) that separates modes by centrifugation and sedimentation through a sucrose gradient. The samples were prepared by adding 1 to 2 drops of the oligomer seed dispersion or the microsphere dispersion into 10 mL of deionized (DI) water containing 0.1% sodium lauryl sulfate, followed by injection of 0.1 mL of the sample into a spinning disc filled with 15 g/mL of sucrose gradient. For the oligomer seed, a 0-4% sucrose gradient disc spinning at 10,000 rpm was used, and a 596-nm polystyrene calibration standard was injected prior to injection of the sample. For the microspheres, a 2-8% sucrose gradient disc spinning at 3,000 rpm was used, and 9-µm polystyrene calibration standard was injected prior to injection of the sample.

Intermediate Example 1—Preparation of a Dispersion of Single Phase Crosslinked Acrylic Microspheres An aqueous dispersion of acrylic oligomer seed (33% solids, 67 butyl acrylate/18 n-dodecyl mercaptan/14.8 methyl methacrylate/0.2 methacrylic acid) with a weight average median particle size ($D_{50}$) of 885 nm, and a weight average molecular weight of 2532 g/mole was prepared substantially as described in U.S. Pat. No. 8,686,096, Examples 1 and 5 (col. 19 and 20). This seed was used to prepare the microspheres of all the Intermediate Examples and Intermediate Comparative Examples described herein.

Initiator emulsion was prepared by combining in a separate vial deionized water (1.0 g), Rhodacal DS-4 branched alkylbenzene sulfonate (DS-4, 0.7 g, 22.5% aq. solution), 4-hydroxy 2,2,6,6-tetramethylpiperidine (4-hydroxy TEMPO, 0.4 g, 5% aq. solution), t-butyl peroxy-2-ethylhexanoate (TBPEH, 5.6 g, 98% active), then emulsified using a stir bar for 10 min. The initiator emulsion was then added to the dispersion of the acrylic oligomer seed (4.5 g, 32% solids) in a separate vial and mixed for 60 min. A shot monomer emulsion (shot ME) was prepared in a separate flask by combining deionized water (162.5 g), Solvay Sipomer PAM-600 phosphate esters of PPG monomethacrylate (PAM-600, 3.0 g, 60% active), DS-4 (5.6 g, 22.5% solution), 4-hydroxy TEMPO (0.3 g, 5% aq. solution), n-butyl acrylate (BA, 339.5 g) and allyl methacrylate (ALMA, 14.2 g). Deionized water (1800 g) was added to a 5-L round bottom flask (reactor) fitted with a stirrer, condenser, and a temperature probe. The reactor was heated to 70° C., after which time the initiator and oligomer seed mixture was added to the reactor, and Shot ME was fed into the reactor over 15 min. After an induction period of 30 min, the resultant exotherm caused the reactor temperature to rise to 80° C.

A first monomer emulsion (MEL prepared by combining deionized water (487.5 g), PAM-600 (9.0 g, 60% active), DS-4 (16.7 g, 22.5% aq. solution), 4-hydroxy TEMPO (0.8 g, 5% aq. solution), BA (1018.6 g) and ALMA (42.5 g) was then fed into the reactor over 63 min. After a 20-min hold, reactor temperature was increased to 95° C. then held for 60 minutes to chase residual monomers. The reactor was allowed to cool, after which time the consequent dispersion was filtered through a 45-μm screen. The filtrate was analyzed for percent solids (33.8%) and $D_{50}$ particle size (8.5 μm, as measured by DCP).

Comparative Intermediate Example 1—Preparation of a Dispersion of Crosslinked Acrylic Microspheres with a High $T_g$ Shell Initiator emulsion was prepared by combining deionized water (1.0 g), DS-4 (0.7 g, 22.5% aq. solution), 4-hydroxy TEMPO (0.4 g, 5% aq. solution), and TBPEH (5.8 g, 98% active) in a vial and stirring for 10 min. The initiator emulsion was then added to the dispersion of the acrylic oligomer seed (4.4 g, 32% solids) in a separate vial and mixed for 60 min. A shot monomer emulsion (shot ME) was prepared in a separate flask by combining deionized water (125.0 g), PAM-600 (2.3 g, 60% active), DS-4 (4.3 g, 22.5% aq. solution), 4-hydroxy TEMPO (0.2 g, 5% aq. solution), BA (261.2 g) and ALMA (10.9 g). Deionized water (1600 g) was added to a 5-L round bottom flask (reactor) fitted with a stirrer, condenser, and a temperature probe. The reactor was heated to 70° C., after which time the initiator and oligomer seed mixture was added to the reactor, and Shot ME was fed into the reactor over 15 min. After an induction period of 30 min, the resultant exotherm caused the reactor temperature to rise to 80° C.

A first monomer emulsion (MEL prepared by combining deionized water (375.0 g), PAM-600 (6.9 g, 60% active), DS-4 (12.9 g, 22.5% aq. solution), 4-hydroxy TEMPO (0.6 g, 5% aq. solution), BA (783.5 g) and ALMA (32.7 g), was then fed into the reactor over 63 min. After a 20-min hold, $NH_4OH$ (0.8 g, 28% aq.) was fed into the reactor over 3 min.

The reactor temperature was cooled to and maintained at 75° C., after which time $FeSO_4 \cdot 7H_2O$ (11.4 g, 0.15% aq.) and EDTA tetrasodium salt (2.1 g, 1.0% aqueous solution) were mixed and added to reactor. A second monomer emulsion (ME2) was prepared in a separate flask by combining deionized water (115.0 g), DS-4 (3.3 g, 22.5% aq. solution), PAM-600 (2.3 g), methyl methacrylate (MMA, 261.2 g), and ethyl acrylate (EA, 10.8 g). ME2, t-butyl hydroperoxide solution (t-BHP, 1.5 g (70% aq. solution) in 18.0 g water) and isoascorbic acid (IAA, 1.1 g in 18 g water) was fed into the reactor over 45 min Residual monomers were then chased by feeding t-BHP solution (2.6 g (70% aq. solution) in 32 g water) and IAA (1.3 g in 32 g water) into the reactor over 20 min. The reactor was allowed to cool, after which time the consequent dispersion was filtered through a 45-μm screen. The filtrate was analyzed for percent solids (34.2%) and $D_{50}$ particle size (8.3 μm, as measured by DCP).

Comparative Intermediate Example 2—Preparation of a Dispersion of Crosslinked Acrylic Microspheres with a High $T_g$ Shell The dispersion was prepared substantially as described to make the dispersion of high $T_g$ clad microspheres of Comparative Intermediate Example 1 except that the initiator emulsion was added to 13.3 g of acrylic oligomer seed (32% solids) instead of 4.4 g. The filtrate was analyzed for percent solids (33.0%) and $D_{50}$ particle size (5.8 μm, as measured by DCP). Table 1 illustrates the basecoat and comparative basecoat formulations. All amounts are in grams.

TABLE 1

Basecoat and Comparative Basecoat Formulations

| Material | Ex 1 | Comp 1 | Comp 2 | Comp 3 |
|---|---|---|---|---|
| Napasoft S2 Softening Agent | 36 | 36 | 36 | 36 |
| PRIMAL ™ SB-300 Acrylic Polymer | 56.2 | 56.2 | 56.2 | 56.2 |
| Bayderm Bottom ELW Polyurethane Binder | 56.2 | 56.2 | 56.25 | 56.2 |
| PRIMAL ™ PR Polyurethane Binder | 112.5 | 112.5 | 112.5 | 112.5 |
| Euderm Black x Pigment | 67.5 | 67.5 | 67.5 | 67.5 |
| Intermediate Example 1 (33.8% active) | 67.5 | | | |
| Comparative Intermediate Example 1 (34.2% active) | | 67.5 | | |
| Comparative Intermediate Example 2 (33.0% active) | | | 67.5 | |
| Euderm Matting Agent SN02 | | | | 50.0 |
| Water | 54.0 | 54.0 | 54.0 | 76.5 |
| ACRYSOL ™ RM-1020 Rheology Modifier | 2.6 | 2.6 | 2.3 | 3.5 |
| Total amount (g) | 450.0 | 450.0 | 450.0 | 455.0 |

Table 2 illustrates the topcoat formulation for all samples.

TABLE 2

Topcoat Formulation

| Material | (g) |
|---|---|
| Water | 76.5 |
| OPTIMATT ™ UD-4 Duller | 202.5 |
| PRIMAL ™ 91UD Polyurethane | 81 |
| Euderm Black x Pigment | 4.5 |
| ROSILK ™ 2229 Feel Modifier | 31.5 |
| Aquaderm Fluid H Wetting Agent | 4.5 |
| ACRYSOL ™ RM-1020 Rheology Modifier | 4.5 |
| Aquaderm XL-80 Crosslinking Agent | 45 |
| Total amount (g) | 450 |

PRIMAL, ACRYSOL, OPTIMATT, and ROSILK are all Trademarks of The Dow Chemical Company or its Affiliates.

All components of Basecoat Example and Comparative Basecoat Examples (Table 1) and topcoat formulation (Table 2) were separately added to a 500-mL paint container and mixed with an overhead agitator for 5 min Basecoat Example and Comparative Basecoat Examples were spray applied to commercial grade automotive corrected leather substrates (6-8 separate substrates used for each basecoat application) and dried for approximately 4 minutes in a 90° C. oven. After curing for 1 d the base coated leather was either embossed with a patterned embossing plate or was subject to a Finiflex smooth roller. The embossed basecoated leather was subjected to either milling (4 h) or mechanical staking. Then, a color coat using the same ingredients as used for the basecoat was applied to the base and dried for approximately 4 min in a 90° C. oven. A topcoat (see Table 2) was then applied to the base and color coated leather and cured for 3 days before testing.

The fully finished articles were subjected to flexibility stress tests using a bally flexometer for either 150,000 cycles at 25° C. or 30,000 cycles at −10° C. After flexing, the samples were visually evaluated for cracking using a 10× stereoscope. The coatings were a assessed a relative rating of 1 to 10 where 1 indicated severe cracking 10 indicated no observable cracking of the coating. Application results for leather coated with the basecoat formulations prepared from Example 1 and Comparative Examples 1 to 3 (illustrated in Table 1), and the topcoat formulation (illustrated in Table 2), are reported in Table 3. The reported average 60° gloss reflect the averages of Finiflex, embossed stake, and embossed milled treatments, with the number of treatments for each illustrated in parentheses. Average 60° basecoat gloss refers to the gloss measured after application of the basecoat; similarly, average 60° topcoat gloss refers to the gloss measured after application of the topcoat. Standard deviations for all measurements are shown parenthetically. Coating failure rating 25° C. refers to the failure rating at 25° C. and 150,000 flex cycles; coating failure rating −10° C. refers to the failure rating at −10° C. and 30,000 flex cycles.

TABLE 3

Application Testing Results for Fully Coated Leather Articles

|  | Ex 1 | Comp 1 | Comp 2 | Comp 3 |
|---|---|---|---|---|
|  | Base coat treatments (Number of substrates) | | | |
|  | Finiflex (2) Embossed staked (2) Embossed milled (2) | Finiflex (2) Embossed staked (2) Embossed milled (2) | Finiflex (2) Embossed staked (4) Embossed milled (2) | Finiflex (2) Embossed staked (4) Embossed milled (2) |
| Average 60° basecoat gloss | 4.3 (±0.2) | 4.5 (±0.1) | 4.8 (±0.3) | 4.5 (±0.2) |
| Average 60° topcoat gloss | 1.1 (±0.3) | 1.2 (±0.1) | 1.4 (±0.1) | 1.3 (±0.2) |
| Coating failure rating 25° C. | 8.0 (±2.4) | 5.2 (±3.4) | 5.4 (±2.5) | 4.0 (±2.4) |
| Coating failure rating −10° C. | 9.0 (±0.0) | 7.5 (±2.5) | 4.9 (±2.7) | 7.1 (±2.7) |

Table 3 shows the results of gloss measurements and flex testing. 60° gloss of all basecoats were comparable independent of the type matting bead used in the basecoat. The average results of bally flex show that the articles that contained the basecoat with the single phase crosslinked polymer particles were showed superior resistance to cracking in accelerated flex testing and with greater consistency across multiple treatments—as evidenced by a lower standard deviation—in contrast with each of the comparative coated leather articles.

What is claimed is:

1. A composition comprising an aqueous dispersion of a) film-forming polymer particles comprising polyurethane polymer particles and having a z-average particle size in the range of from 50 nm to 500 nm, as determined by dynamic light scattering, and a $T_g$ of less than 10° C.; and b) non-film-forming single phase crosslinked polymeric microspheres having a median weight average particle size in the range of from 2 μm to 30 μm and a $T_g$ of not greater than 10° C.

2. The composition of claim 1 wherein the single phase crosslinked polymeric microspheres comprise from 50 to 99 weight percent structural units of one or more monoethylenically unsaturated monomers, the homopolymers of which have a $T_g$ of not greater than 10° C.; and from 1 to 10 weight percent structural units of a multiethylenically unsaturated monomer.

3. The composition of claim 1 wherein the single phase crosslinked polymeric microspheres comprise from 70 to 97.5 weight percent structural units of one or more monoethylenically unsaturated monomers selected from the group consisting of methyl acrylate, ethyl acrylate, n-butyl acrylate, and 2-ethylhexyl acrylate; and from 2 to 8 weight percent structural units of a multiethylenically unsaturated monomer.

4. The composition of claim 3 which comprises a substantial absence of multiphase microspheres; and wherein the polyurethane polymer particles comprise at least 30 weight percent of the polymer particles in the composition.

5. The composition of claim 4 which comprises less than 5 weight percent, based on the weight of total microspheres in the composition, of multiphase microspheres; wherein the polyurethane polymer particles comprise at least 50 weight percent of film-forming polymer particles in the composition, and wherein the composition further comprises non-polyurethane film-forming polymer particles having a $T_g$ of less than 10° C. and a z-average particle size in the range of from 50 nm to 500 nm; and wherein the weight-to-weight ratio of the crosslinked single phase microspheres to the film-forming polymer particles having a $T_g$ of less than 10° C. is in the range of 1:1 to 1:10.

6. The composition of claim 5 wherein the non-polyurethane polymer particles are acrylic polymer particles comprising at least 50 weight percent, based on the weight of the acrylic polymer particles, structural units of methyl methacrylate and an acrylate monomer selected from the group consisting of methyl acrylate, ethyl acrylate, n-butyl acrylate, and 2-ethylhexyl acrylate; and wherein the weight-to-weight ratio of the crosslinked single phase microspheres to the film-forming polymer particles having a $T_g$ of less than 10° C. is in the range of 1:2 to 1:8.

7. The composition of claim 3 wherein the single phase crosslinked polymeric microspheres further comprise, based on the weight of the microspheres, from 0.05 to 5 percent structural units of a polymerizable organic phosphate represented by the structure of Formula I:

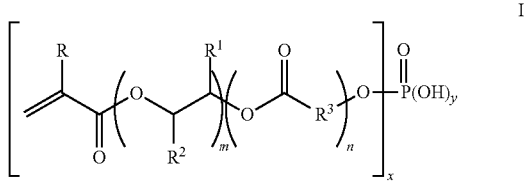

or a salt thereof; wherein R is H or $CH_3$, wherein $R^1$ and $R^2$ are each independently H or $CH_3$, with the proviso that $CR^2CR^1$ is not $C(CH_3)C(CH_3)$; each $R^3$ is independently linear or branched $C_2$-$C_6$ alkylene; m is from 1 to 10; n is from 0 to 5; with the proviso that when m is 1, then n is from 1 to 5; x is 1 or 2; and y is 1 or 2; and x+y=3.

8. The composition of claim 7 wherein n is 0; m is from 3 to 7; x is 1; y is 2; each $R^2$ is H; and each $R^1$ is $CH_3$; or wherein n is 1; m is 1; R is $CH_3$; $R^1$ and $R^2$ are each H; $R^3$ is —$(CH_2)_5$—; x is 1 or 2; y is 1 or 2; and x+y=3.

9. The composition of claim 3 wherein the single phase crosslinked polymeric microspheres further comprise, based on the weight of the microspheres, 0.05 to 5 weight percent of an ethylene oxide salt of a distyryl or a tristyryl phenol represented by the structure of Formula IV:

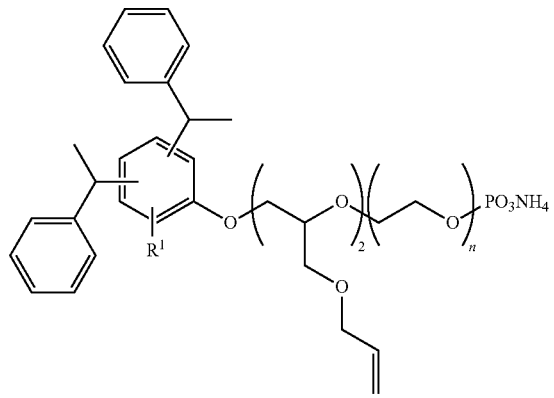

IV where $R^1$ is H, $CH_2CR=CH_2$, $CH=CHCH_3$, or 1-phenethyl; R is $C_1$-$C_4$-alkyl; and n is 12 to 18.

10. The composition of claim 1 wherein the single phase crosslinked polymeric microspheres comprise from 80 to 97.5 weight percent structural units of n-butyl acrylate; from 2 to 6 weight percent structural units of allyl methacrylate; and from 0.05 to 5 percent structural units of a polymerizable organic phosphate represented by the following structure:

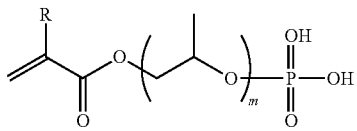

wherein R is H or $CH_3$; and m is from 3 to 7;

wherein the polyurethane polymer particles comprise at least 50 weight percent of film-forming polymer particles in the composition, and wherein the composition further comprises acrylic polymer particles having a $T_g$ of less than 10° C. and a z-average particle size in the range of from 50 nm to 500 nm, wherein the acrylic polymer particles comprise at least 80 percent, based on the weight of the acrylic polymer particles, structural units of methyl methacrylate and an acrylate monomer selected from the group consisting of ethyl acrylate, n-butyl acrylate, and 2-ethylhexyl acrylate; and wherein the composition comprises 0 weight percent multiphase microspheres.

11. The composition of claim 1 which further comprises one or more additional components selected from the group consisting of rheology modifiers, pigments, surfactants, softening agents, matting agents, and waxes.

* * * * *